United States Patent [19]

Gaul, Jr.

[11] Patent Number: 4,507,072

[45] Date of Patent: Mar. 26, 1985

[54] DIVERTING PLATE

[75] Inventor: Milton U. Gaul, Jr., Hockessin, Del.

[73] Assignee: E. I. DuPont de Nemours and Company, Wilmington, Del.

[21] Appl. No.: 436,455

[22] Filed: Oct. 25, 1982

[51] Int. Cl.³ .............................................. B29F 3/06
[52] U.S. Cl. ..................................... 425/185; 210/236; 210/447; 264/169; 425/186; 425/197; 425/199
[58] Field of Search ................................ 425/185–186, 425/183, 197, 198, 199; 210/236, 447; DIG. 15; 264/169

[56] References Cited

U.S. PATENT DOCUMENTS

| | | | |
|---|---|---|---|
| 3,007,199 | 11/1961 | Curtis | 425/198 |
| 3,345,854 | 10/1967 | Gross | 425/183 |
| 3,583,453 | 6/1971 | Upmeier | 425/186 |
| 3,589,163 | 6/1971 | Byrne et al. | 425/185 |
| 3,669,166 | 6/1972 | Colin | 425/183 |
| 3,675,934 | 7/1972 | Heston | 277/12 |
| 3,856,277 | 12/1974 | Tiramani | 425/185 |
| 3,962,092 | 6/1976 | Newman, Jr. | 425/199 |
| 4,025,434 | 5/1977 | Mladota | 425/197 |
| 4,070,138 | 1/1978 | Stanwood | 425/185 |
| 4,167,384 | 9/1979 | Shirato et al. | 425/185 |
| 4,213,747 | 7/1980 | Friedrich | 425/146 |
| 4,416,605 | 11/1983 | Konno et al. | 264/169 |

FOREIGN PATENT DOCUMENTS

| | | | |
|---|---|---|---|
| 2153962 | 8/1972 | Fed. Rep. of Germany | 425/199 |
| 2144032 | 2/1973 | France | 425/197 |
| 45-2477 | 1/1970 | Japan | 425/197 |
| 504945 | 5/1971 | Switzerland | 425/183 |
| 1047533 | 11/1966 | United Kingdom | 425/197 |

OTHER PUBLICATIONS

Plastics Design & Processing, Apr./May 1982.
Gala Industries, Inc., Bulletin DV/SC-1, undated.

Primary Examiner—Jeffery Thurlow

[57] ABSTRACT

A diverting plate having the same external configuration as a changeable strainer in a flow line for a molten polymer. Contamination is removed by substituting the plate for a strainer.

3 Claims, 7 Drawing Figures

DIVERTING PLATE

BACKGROUND

In the extrusion of polymeric melts, the extrudate is usually forced through a strainer to remove particles of gel and other impurities. After a period of operation, a screen pack in the strainer becomes clogged and must be changed. Although different types are available, a particularly useful changer of the cartridge type has been disclosed by Heston in U.S. Pat. No. 3,675,934.

With reactive polymer systems, abnormal amounts of gel and/or degraded polymer can be formed on startup. As a consequence, the screen pack in the transfer line to a die clogs rapidly and must be changed so frequently as to be impractical.

SUMMARY

The need for frequent changing of clogged strainers in a transfer line, due to unacceptable contamination of a melt, has been eliminated by provision of a plate for diverting the melt to waste. Except for a passage therethrough for diverting the melt from its normal path, the plate is solid. It has the same external configuration as and is adapted for use in place of a strainer.

DRAWINGS

Figure 3:
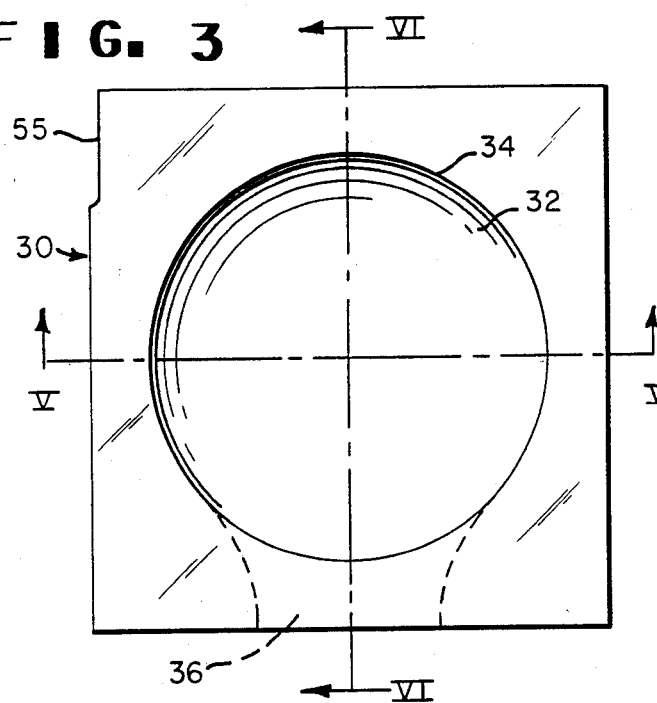
Figure 6:
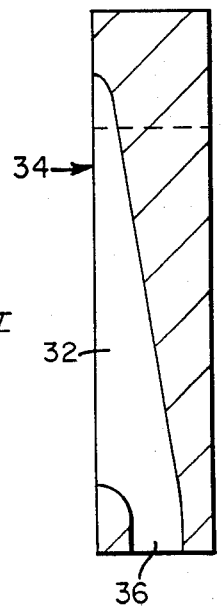
Figure 4:
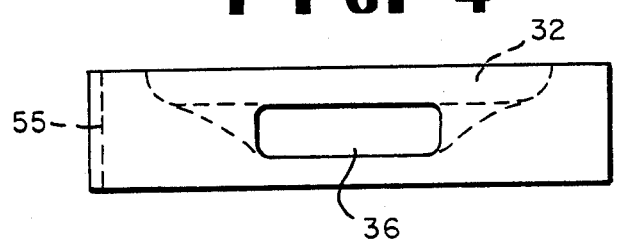
Figure 7:
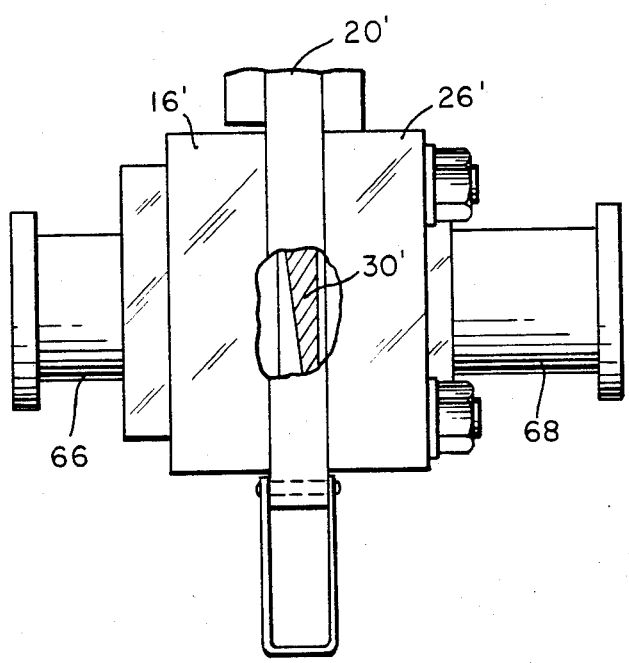

Other objectives and advantages of the present invention will be apparent from the following description wherein reference is made to the accompanying drawings. In the drawings, FIGS. 1 and 2 are side and end views, respectively, of an extruder equipped with an apparatus for changing strainers, FIGS. 3 and 4 are end and bottom views, respectively, of the diverting plate shown in FIGS. 1 and 2, FIGS. 5 and 6 are sectional views taken on lines V—V and VI—VI in FIG. 3 and FIG. 7 is a fragmentary illustration of a screen changer and adapters for coupling it into a transfer line for viscous materials.

DESCRIPTION

Figure 1:
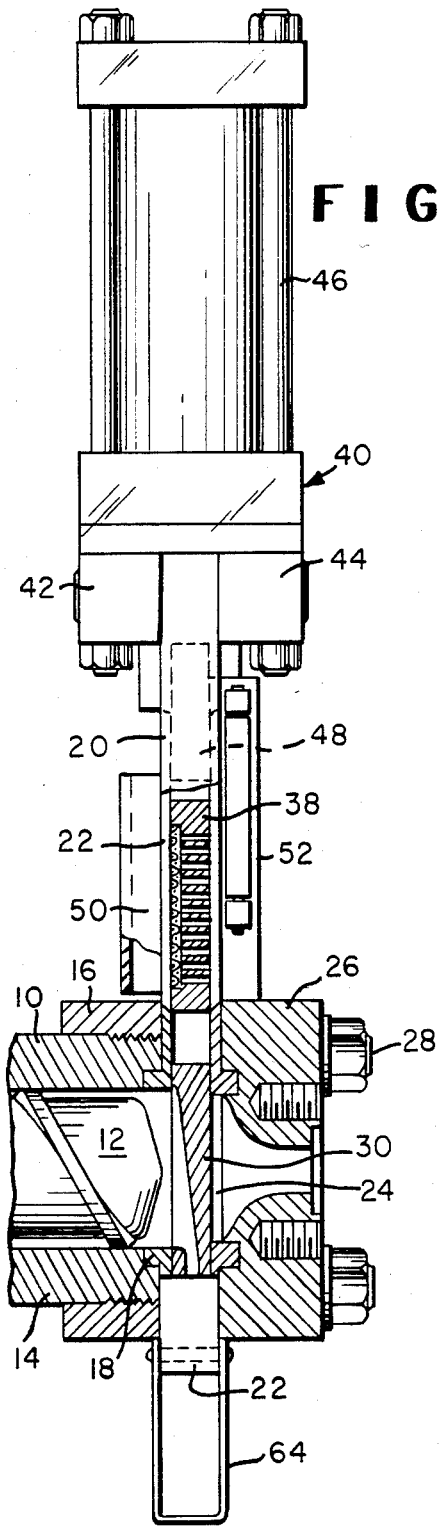
Figure 2:
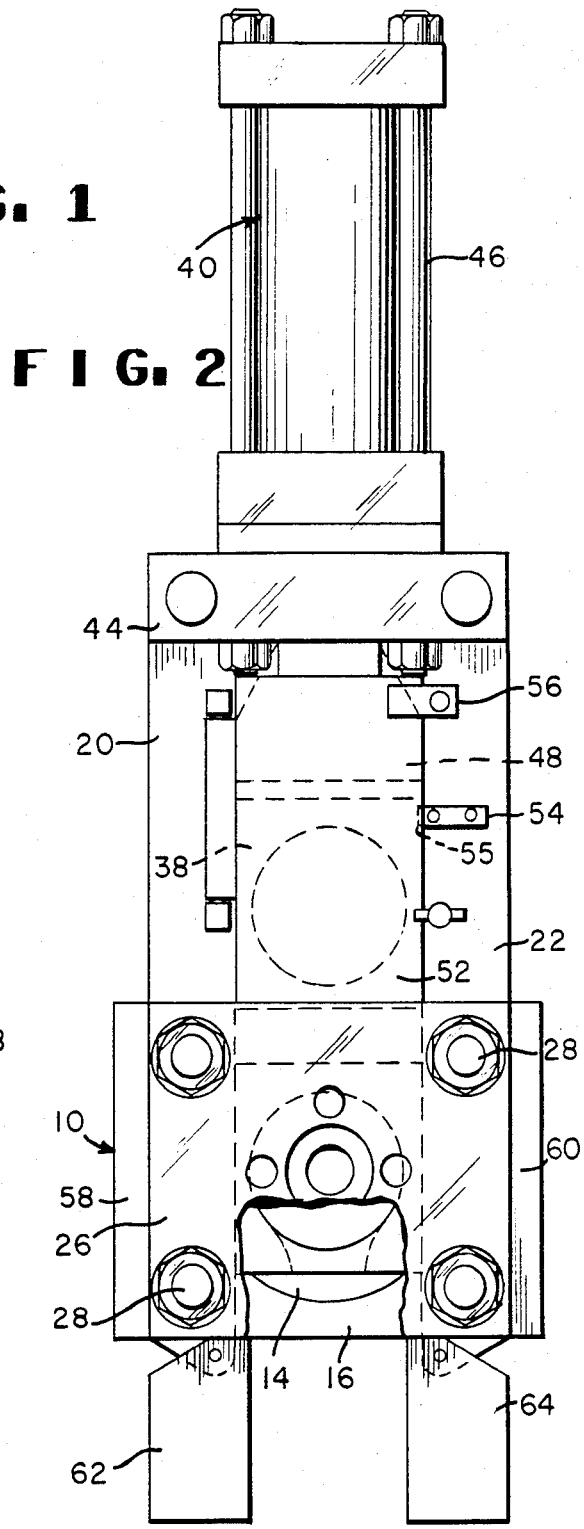
Figure 5:
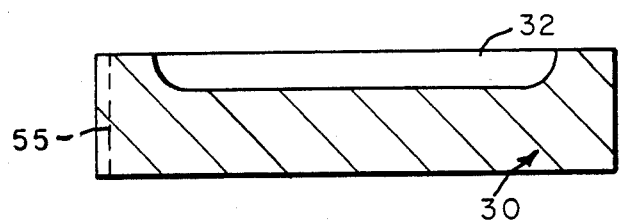

An extruder equipped with a screen changer of the type disclosed by Heston is shown at 10 in FIGS. 1 and 2. Extruder 10 has a screw 12 in a barrel 14. The end of barrel 14 is threaded to receive a mounting block 16 and is also adapted to receive a collar on a sealing plate 18. On the other side of a pair of side bars 20, 22, there is another sealing plate 24 and a die block 26. Sealing plates 18, 24 and die block 26 are attached to mounting block 16 by fasteners 28 which also pass through openings in side bars 20, 22. A diverting plate 30 of the present invention is shown in place at the outlet of extruder 10, between sealing plates 18, 24. Fasteners 28 are adjusted to provide the desired sealing force between sealing plates 18, 24 and the diverting plate 30. Block 26 is adapted for attachment to either a die, an adapter or a transfer line leading to a die.

Referring now to FIGS. 3-6, plate 30 is generally square and has a round cavity 32 with a mouth 34 of substantially the same dimensions as the inside of barrel 14. Test embodiments have been fabricated from tool steel. Cavity 32 is tapered from its shallowest depth at the upper end to a maximum depth at the bottom where it communicates with a discharge port 36. The surface of cavity 32 is contoured with large corner radii to promote streamline flow. The external configuration, namely, the length, width, depth and other peripheral dimensions of plate 30, are the same as those of a stainer 38 (FIGS. 1 and 2) which includes the usual breaker plate and a screen pack.

Side bars 20, 22 extend upwardly from blocks 16, 26 a sufficient distance to permit insertion of either a diverting plate 30 or a strainer 38 and to serve as mounts for a double-acting piston and cylinder assembly 40. Assembly 40 is mounted on cross bars 42, 44 by tie rods 46. The rod of assembly 40 extends downwardly and is connected to a ram 48 which is positioned for engagement with the top of strainer 38.

On the back side of bars 20, 22, at the location of strainer 38, there is a preheater 50. On the front side, there is a hinged door 52 which, when opened, permits insertion of either a diverting plate 30 or a strainer 38 between bars 20, 22 where it is supported by the upper ends of sealing plates 18, 24. A key 54 clears a recess 55 on one side of either a plate 30 (FIGS. 3-6) or a strainer 38 to insure its proper placement. A tab 56 on door 52 actuates a microswitch on bar 22 to activate the controls for piston and cylinder assembly 40. Heaters 58, 60 are located on the sides of blocks 16, 26.

At startup, a diverting plate 30 is placed between bars 20, 22, beneath ram 48, and then moved to the position shown in FIG. 1 by the action of piston and cylinder assembly 40. Its external surfaces can be coated with anti-galling compounds to promote easy sliding between the sealing plates 18, 24. This action ejects the strainer or diverting plate then in the apparatus to a pair of pivotal catch hangers 62, 64. When a strainer is removed from hangers 62, 64, the extrudate flows freely through the slot between mounting block 16 and die block 26 to a waste container. In this manner, off-grade materials can be released from the transfer line quickly, thus avoiding the necessity of a costly shutdown to clean downstream passages. A clean strainer 38 is put in position to replace plate 30 when the upstream system has been purged of contaminants. A diverting plate can also be used at any time during a process run such as during a process upset and at the end of a process run to purge the extruder.

In FIG. 7, an apparatus for changing strainers and diverting plates has been shown between a pair of adapters 66, 68. Adapter 66 is attached at one end to mounting block 16' and, at its other end, can be attached to either an extruder or a transfer line for viscous materials. Adapter 68 is attached at one end to block 26' and, at its other end, can be attached to either a die or a transfer line.

What is claimed as new and desired to be secured by Letters Patent is:

1. In an apparatus for changing strainers in a flow line for viscous materials, the improvement comprising provision of an otherwise solid plate having a passage therethrough for diverting materials from the line, said plate having the same external configuration as and being adapted for use in place of a strainer.

2. The apparatus of claim 1 wherein said plate has a cavity in one surface and a port leading from the cavity to the side of the plate, said cavity and port defining said passage, said cavity being tapered from a maximum depth adjacent said port to its shallowest depth opposite said port.

3. In an installation including an extruder, a flow line leading from the extruder, a strainer in the flow line and an associated apparatus of the cartridge type for changing strainers, the improvement comprising provision of an otherwise solid plate having a passage therethrough for diverting extrudate from the line, said plate having the same external dimensions as and being adapted for use in place of either a strainer or another plate, said plate having a cavity in one surface and a port leading from the cavity to the side of the plate, said cavity being tapered from a maximum depth adjacent said port to its shallowest depth opposite said port.

* * * * *